United States Patent
Colbourne

(10) Patent No.: US 9,488,787 B2
(45) Date of Patent: Nov. 8, 2016

(54) CROSS-CONNECT SWITCH USING 1D ARRAYS OF BEAM STEERING ELEMENTS

(71) Applicant: Lumentum Operations LLC, Milpitas, CA (US)

(72) Inventor: Paul Colbourne, Ottawa (CA)

(73) Assignee: Lumentum Operations LLC, Milpitas, CA (US)

( * ) Notice: Subject to any disclaimer, the term of this patent is extended or adjusted under 35 U.S.C. 154(b) by 388 days.

(21) Appl. No.: 14/230,444

(22) Filed: Mar. 31, 2014

(65) Prior Publication Data

US 2015/0277056 A1 Oct. 1, 2015

(51) Int. Cl.
*G02B 6/26* (2006.01)
*G02B 6/35* (2006.01)

(52) U.S. Cl.
CPC ............ *G02B 6/3518* (2013.01); *G02B 6/356* (2013.01)

(58) Field of Classification Search
CPC .............................. G02B 6/3518; G02B 6/356
USPC ........................................................... 385/17
See application file for complete search history.

(56) References Cited

U.S. PATENT DOCUMENTS

| | | |
|---|---|---|
| 6,487,334 B2 | 11/2002 | Ducellier et al. |
| 6,560,000 B2 | 5/2003 | Iyer et al. |
| 6,711,316 B2 | 3/2004 | Ducellier |
| 7,039,267 B2 | 5/2006 | Ducellier et al. |
| 8,531,752 B2 | 9/2013 | Moidu |
| 9,069,139 B2 | 6/2015 | McLaughlin et al. |
| 2005/0105851 A1* | 5/2005 | Stone .................. G02B 6/2931 385/37 |
| 2009/0028503 A1 | 1/2009 | Garrett et al. |
| 2013/0272650 A1* | 10/2013 | Ishikawa .................. G02B 6/35 385/17 |
| 2014/0072302 A1 | 3/2014 | Iwama et al. |
| 2015/0078748 A1* | 3/2015 | Tazawa .................. G02B 6/356 398/48 |
| 2016/0165324 A1* | 6/2016 | Zhao ....................... H04J 14/02 398/48 |

FOREIGN PATENT DOCUMENTS

| | | |
|---|---|---|
| CA | 2326362 | 5/2002 |
| WO | WO 2013/066778 | 5/2013 |

OTHER PUBLICATIONS

Aksyuk et al., "238×238 Micromechanical Optical Cross Connect", IEEE Photonics Technology Letters, vol. 15, No. 4, Apr. 2003, 3 pages.
Syms, "Scaling Laws for MEMS Mirror-Rotation Optical Cross Connect Switches", Journal of Lightwave Technology, vol. 20, No. 7, Jul. 2002, 11 pages.

* cited by examiner

*Primary Examiner* — Sung Pak
(74) *Attorney, Agent, or Firm* — Harrity & Harrity, LLP

(57) ABSTRACT

An optical cross-connect including two deflector arrays optically separated by an angle-to-offset (ATO) element, wherein each deflector array includes a plurality of deflectors aligned in an array direction, each deflector array having a switching direction substantially perpendicular to the corresponding array direction, the array direction of the two deflector arrays being substantially perpendicular. Beam shaping optics convert light transmitted towards the first deflector array to have an elliptical cross-section at the first deflector array, thus providing a relatively simple and compact optical cross-connect.

20 Claims, 10 Drawing Sheets

CROSS-CONNECT SWITCH USING 1D ARRAYS OF BEAM STEERING ELEMENTS

CROSS-REFERENCE TO RELATED APPLICATIONS

Not Applicable.

TECHNICAL FIELD

The present invention relates generally to optical switches, and in particular to optical cross-connects.

BACKGROUND OF THE INVENTION

Optical switches are commonly used in fiber optic communication systems for switching an optical signal from one optical fiber to another. An optical cross-connect is an optical switch that includes multiple input and/or output ports and has the ability to provide, for the purposes of signal transfer, various input port/output port combinations.

Optical cross-connects are often broadly classified according to the optics used to route the light and perform the switching (e.g., waveguide or free-space). Optical cross-connects based on the deflection of free-space light beams have emerged as excellent candidates for use in optical fiber communication systems due to their relatively low insertion loss, low cross talk, and insensitivity to wavelength and polarization. Free-space based optical cross-connects typically include multiple input ports and output ports connected across a switch core, which has the ability to connect, for purposes of signal transfer, any input port to any output port.

The switch core typically uses one or more arrays of beam-steering elements. For example, in many free-space based systems the switch core will include one or more deflector arrays, wherein each deflector array includes an array of tiltable mirrors fabricated using micro-electromechanical systems (MEMS) technology. In general, the input and output ports will be physically located on opposite sides of the switch core for direct or folded optical pathway communication therebetween, or will be located on the same physical side of the switch core facing a mirror (e.g., in side-by-side matrices or interspersed in a single matrix arrangement).

Referring to FIG. 1, a schematic diagram of one prior art optical switch core is shown. The optical switch 100 includes an input fiber array 116, an output fiber array 118, collimators 114, and two deflector arrays 112. A light beam transmitted from an input fiber of input fiber array 116 is switched to a selected output fiber of output fiber array 118 along a folded Z-shaped optical path through the switch 100. The individual deflectors 110 on the deflector arrays 112 provide the deflection along the folded optical pathway, thus allowing for a more compact switch design.

Referring to FIG. 2, a schematic presentation of another prior art optical switch core is shown. The optical switch 200 includes an input fiber array 216, an output fiber array 218, two deflector arrays 212, and an angle-to-offset (ATO) lens 220. The ATO lens 220, which has a focal length f, is disposed in the center of the switch core between the first and second deflector arrays 212. More specifically, the first and second deflector arrays 212 are disposed at a focal plane of the ATO lens 220. The ATO lens 220 provides a re-imaging and deflects the propagation path of light within the switch core. As is discussed in U.S. Pat. Nos. 6,487,334, 6,711,316, and 7,039,267, which are hereby incorporated by reference, the use of an ATO element provides an optical switch having reduced aberrations and/or that is relatively compact.

In the optical switch cores illustrated in FIGS. 1 and 2, each deflector array 112/212 is a 2D array of $N^2$ dual axis MEMS mirrors. For example, in one embodiment, each mirror is a silicon or polysilicon mirror mounted with a gimbal suspension. The number of ports achievable is limited by the diameter of the light beams incident on the MEMS mirrors and the range through which the MEMS mirrors can rotate/tilt. For example, the tilt angle may be limited by the snap-down phenomenon, whereas the diameter of the light beams may be limited by the optical layout and the size of the individually addressable MEMS mirrors. In each optical switch core 100/200, the light beams incident on the individual MEMS mirrors have a round cross-section (e.g. there is a beam waist at each of the individual MEMS mirrors in the array). In addition, the switch cores are designed such that the light beams incident on the MEMS mirrors in the MEMS arrays 112/212 have the same diameter within each switch. For example, referring to FIG. 3, which schematically illustrates the beam size through the switch core 100, it is clear that the configuration causes the illumination spots on each micro-mirror in the array 112 to have a same diameter ($w_m$). In addition, the switching directions of the two deflector arrays 112 are parallel, and the switching directions of the two deflector arrays 212 are parallel.

SUMMARY OF THE INVENTION

An optical cross-connect including two deflector arrays optically separated by an angle-to-offset (ATO) element, wherein the switching direction of each deflector array is perpendicular to the other, and wherein elliptical light beams are incident on the deflector arrays, has been found to provide a relatively simple and compact optical cross-connect. Advantageously, this configuration only requires deflector arrays that provide deflection in a single dimension (e.g., arrays of 1D deflectors), thus simplifying fabrication.

In accordance with one aspect of the instant invention there is provided an optical cross-connect comprising: an input port array and an output port array, the input port array including a first input port for launching a beam of light; a first deflector array optically disposed between the input port array and the output port array, the first deflector array including a first plurality of individually controllable deflectors aligned in a first array direction, each deflector in the first plurality of individually controllable deflectors having a switching direction substantially perpendicular to the first array direction; a second deflector array optically disposed between the first deflector array and the output port array, the second deflector array including a second plurality of individually controllable deflectors aligned in a second array direction, the second array direction substantially perpendicular to the first array direction, each deflector in the second plurality of individually controllable deflectors having a switching direction substantially perpendicular to the second array direction; first beam shaping optics optically disposed between the input port array and the first deflector array and second beam shaping optics optically disposed between the output port array and the second deflector array, the first beam shaping optics for shaping the beam of light and providing a first elliptical beam spot at the first deflector array, a major axis of the elliptical spot substantially parallel to the switching direction of the first deflector array; and an angle-to-offset element optically disposed between the first and second deflector arrays, the angle-to-offset element having an optical axis and at least one focal length, wherein each of the first and second deflector arrays is disposed substantially at a focal plane of the angle-to-offset element such that the angle-to-offset element directs the beam of light from the first deflector array to the second deflector array and provides a second elliptical beam spot on the second deflector array, the second elliptical beam spot having a major axis substantially perpendicular to the major axis of the first elliptical beam spot.

In accordance with one aspect of the instant invention there is provided an optical cross-connect comprising: an array of input ports, each input port for providing a beam of light; input beam shaping optics for forcing each beam of light to have an elliptical cross-section; a first deflector array including a first plurality of deflectors, each deflector in the first plurality of deflectors comprising an individually controllable deflector optically coupled to a different input port, each deflector in the first plurality of deflectors aligned along a first axis and having a switching direction substantially perpendicular to the first axis, the first axis oriented relative to the first beam shaping optics such that the elliptical cross-section of each beam of light at the first deflector array has a major axis substantially perpendicular to the first axis; an angle-to-offset element for transforming deflection angles provided by the deflectors of the first deflector array into offsets in direction substantially perpendicular to the first axis, the angle-to-offset element having an optical axis and at least one focal length; a second deflector array including a second plurality of deflectors, each deflector in the second plurality of deflectors comprising an individually controllable deflector, each deflector in the second plurality of deflectors aligned along a second axis and having a switching direction substantially perpendicular to the second axis, the second axis substantially perpendicular to the first axis such the elliptical cross-section of each beam of light at the second deflector array has a major axis perpendicular to the second axis; second beam shaping optics for forcing the beams of light having an elliptical cross-section and deflected from the second deflector array to have a substantially circular cross-section; and an array of output ports, each output port for selectively receiving one of the beams of light having a circular cross-section.

BRIEF DESCRIPTION OF THE DRAWINGS

Further features and advantages of the present invention will become apparent from the following detailed description, taken in combination with the appended drawings, in which:

FIG. 5b is a top view of the switch core illustrated in FIG. 5a;

FIG. 5c is a side view of the switch core illustrated in FIG. 5a;

It will be noted that throughout the appended drawings, like features are identified by like reference numerals.

DETAILED DESCRIPTION OF THE INVENTION

Figure 1:
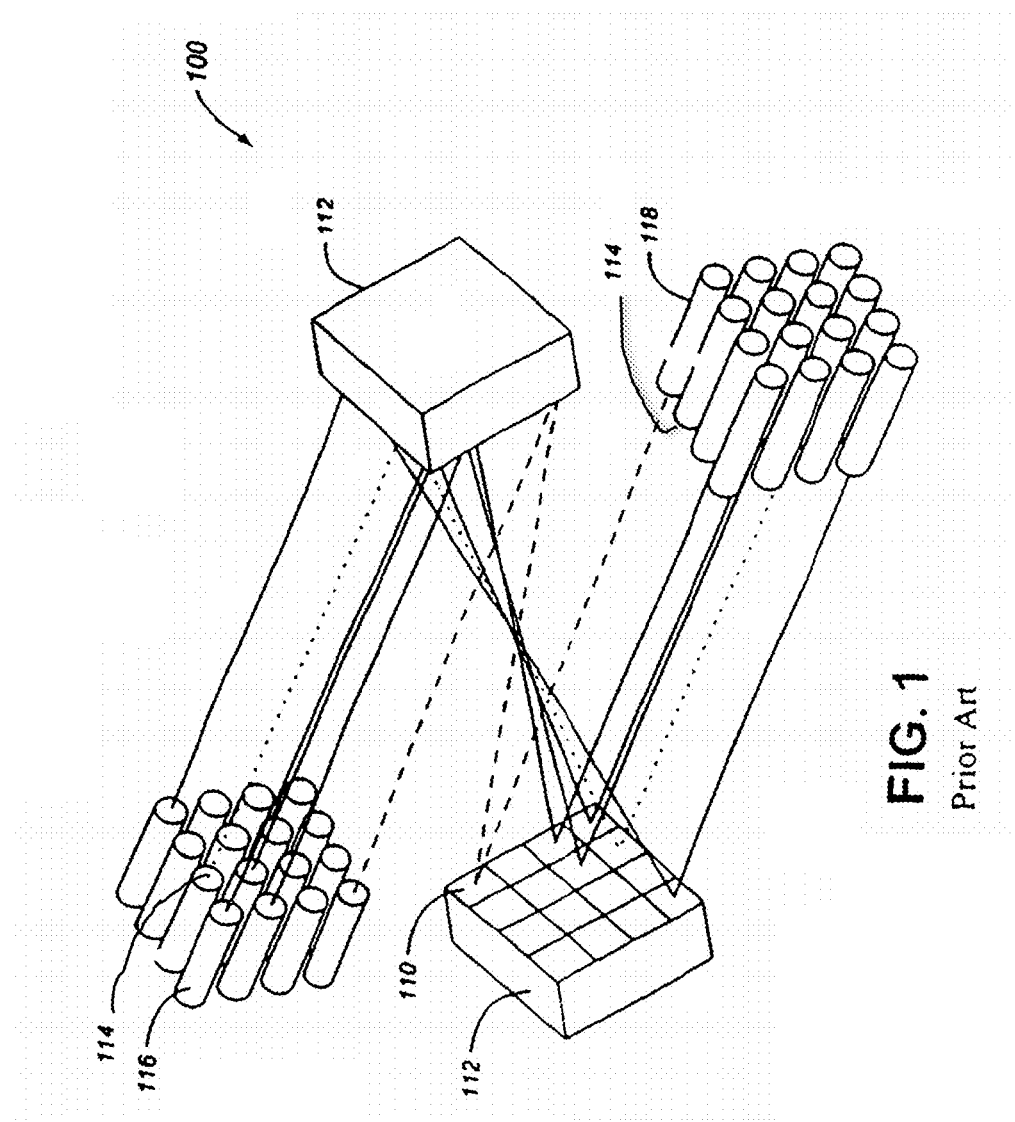
FIG. 1 is a schematic diagram of a prior art optical switch core having two MEMS mirror arrays.
Figure 2:
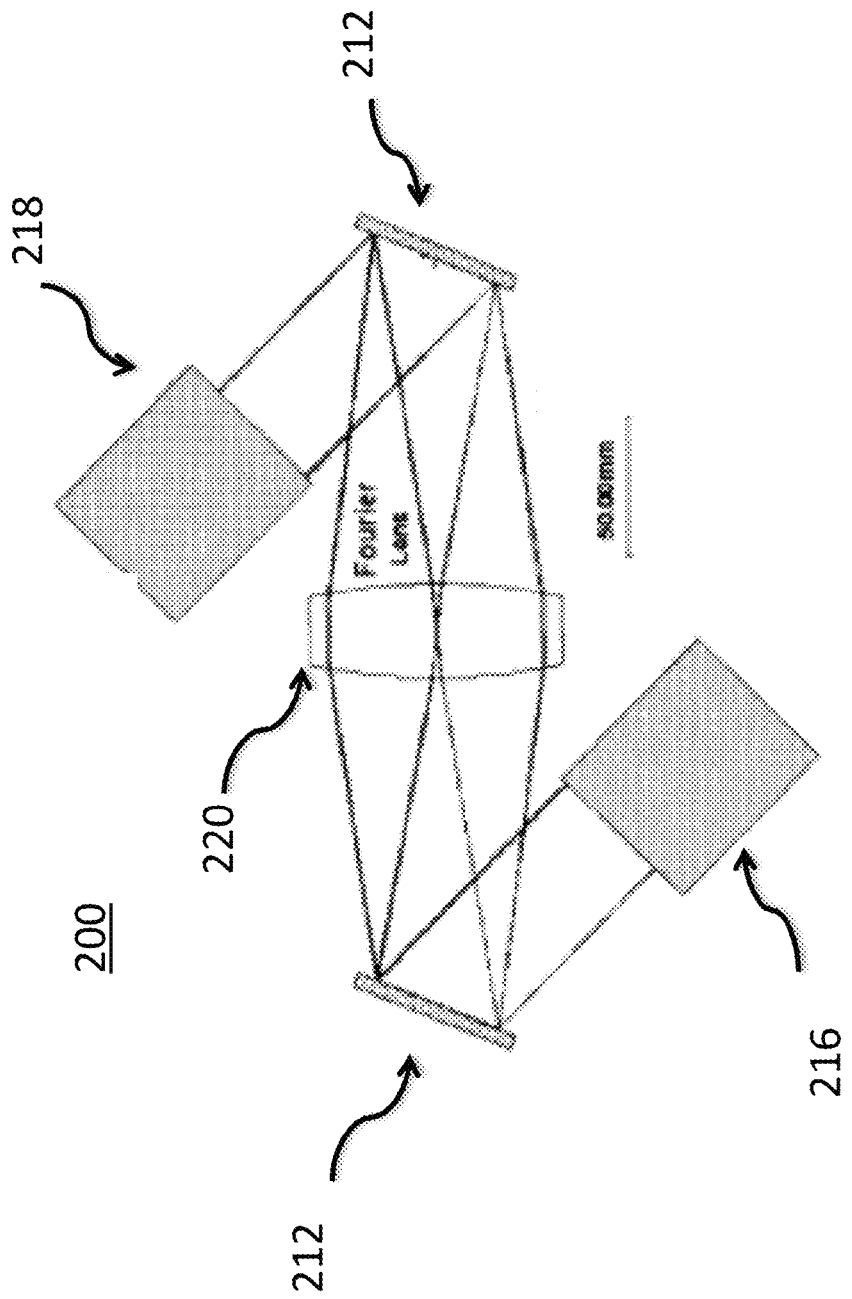
FIG. 2 is a schematic diagram of a prior art optical switch core having two MEMS mirror arrays and an ATO lens.
Figure 3:
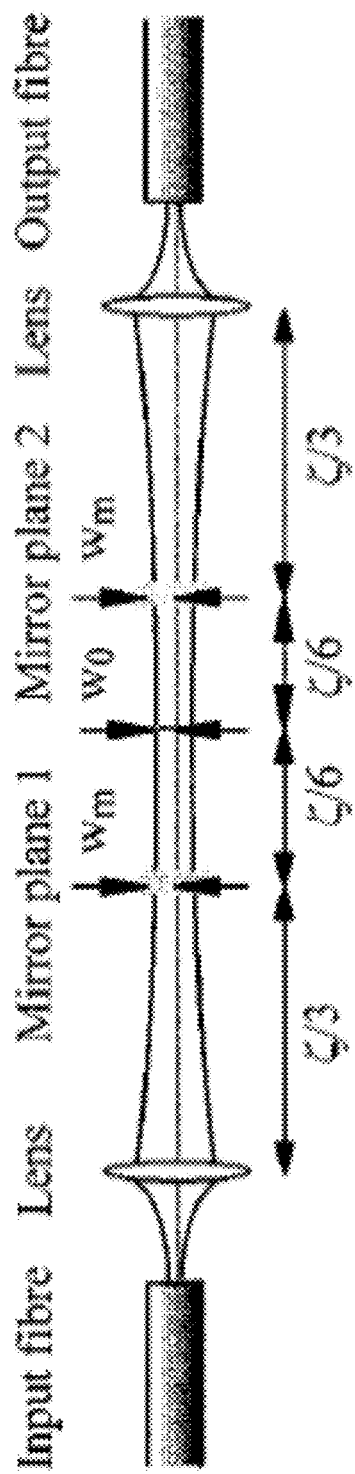
FIG. 3 is a schematic diagram illustrating the beam size within the switch core illustrated in FIG. 1, wherein the optical path has been unfolded and only one input fiber and output fiber are included for exemplary purposes.
Figure 4:
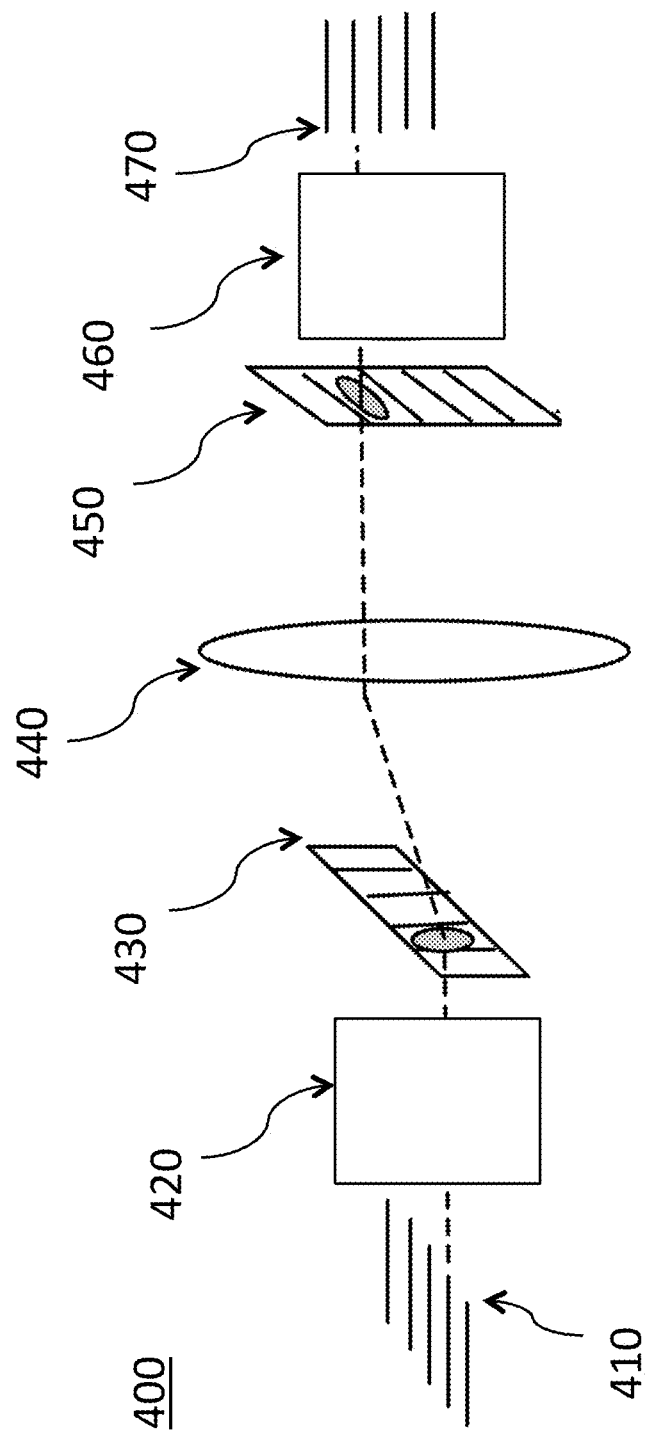
FIG. 4 is a schematic diagram of a switch core in accordance with one embodiment of the instant invention.

Referring to FIG. 4, there is shown a schematic diagram of a switch core of an optical cross-connect in accordance with one embodiment of the instant invention. The switch core 400, which is illustrated in an unfolded configuration for exemplary purposes, includes an input port array 410, input beam shaping optics 420, a first deflector array 430, an angle-to-offset (ATO) element 440, a second deflector array 450, output beam shaping optics 460, and an output port array 470.

The input port array 410 includes a plurality of input ports for launching light into the switch core, whereas the output port array 470 includes a plurality of output ports for selectively receiving light from the input ports. In general, each port in the input port array 410 and the output port array 470 will be optically coupled to an optical fiber or waveguide. For example, in one embodiment the input port array is optically coupled to an input fiber array and the output port array is optically coupled to an output fiber array. Optionally, each input and each output optical fiber/waveguide is optically coupled to a collimating/focusing lens centered on the optical axis thereof. For example, in one embodiment, the input and output port arrays are optically coupled to input and output fiber arrays, respectively, which are terminated in microlens arrays. In another embodiment, the end of each input and each output optical fiber/waveguide is provided with an expanded core. In another embodiment, the input fiber array is coupled to a planar waveguide concentrator in which the waveguide spacing equals the fiber spacing on a first end coupled to the fiber array, and the waveguide spacing is smaller than the fiber spacing on a second end. Providing each optical fiber/waveguide with a collimating/focusing lens, an expanded core, or a waveguide concentrator advantageously allows the number of input/output ports to increase.

The input port array 410 has N ports aligned in a first array direction and the output port array 470 has N ports aligned in a second array direction. Referring again to FIG. 4, the first array direction is perpendicular to the second array direction, both of which are perpendicular to the light propagation direction. The number of input and/or output ports is typically between 3 and 300, and more commonly between 3 and 200. For example, in one embodiment, N=64. Notably, although this description includes references to input and output ports/fibers/waveguides for exemplary purposes, it will be understood that each of the ports/fibers/waveguides may send and/or receive optical signals, depending upon the direction of propagation of an optical signal.

Each of the input beam shaping optics 420 and output beam shaping optics 460 includes one or more elements for producing elliptical beam spots on deflector arrays 430/450. In particular, input beam shaping optics 420 cause beams of light propagating from the array of input ports 410 to produce elliptical beam spots on the first deflector array 430, whereas output beam shaping optics 460 cause elliptical beams from the second deflector array 450 to produce round spots on the array of output ports 470 (e.g., or conversely, cause beams of light propagating from the array of output ports 470 to produce elliptical beam spots on the second deflector array 450). In one embodiment, each of the input 420 and output 460 beam shaping optics includes an anamorphic collimating/focusing element, such as a cylindrical lens, which by definition produces unequal magnifications along two perpendicular axes thereof. For example, in one embodiment the beam shaping optics include a cylindrical lens optically disposed between two spherical lenses, whereas in another embodiment, the beam shaping optics include a negative cylindrical lens (i.e., diverging) and a positive cylindrical lens (i.e., converging) having different optical powers. In yet another embodiment, each of the input and output beam shaping optics includes a pair of anamorphic prisms. Many other arrangements of spherical or aspherical lenses or mirrors, cylindrical lenses or mirrors, or prisms can be used to produce elliptical beam spots. In the embodiments described above, the input and output beam shaping optics include one or more optics, each of which helps to shape all of the beams of light launched to/from the input/output ports, however, in one embodiment of the instant invention separate beam shaping optics are provided for each individual port (e.g., integrated with the optical fiber/waveguides). Referring again to FIG. 4, the anamorphic optics in the input 420 and output 460 beam shaping optics generally will be oriented such that the major axis of the elliptical beams spots on the first 430 and second 450 deflector arrays are perpendicular. For example, consider the embodiment illustrated in FIG. 5a, wherein each of the input 420 and output 460 beam shaping optics includes a cylindrical lens optically disposed between two spherical lenses. In this embodiment, the cylindrical axis of the cylindrical lens in the input beam shaping optics is perpendicular to cylindrical axis of the cylindrical lens in the output beam shaping optics (i.e., wherein both cylindrical axes are perpendicular to the light propagation direction).

Each of the first deflector array 430 and second deflector array 450 is a one dimensional array (i.e., a 1D array) of individually controllable beam-steering elements. More specifically, the first deflector array 430 is an array of N individually controllable beam steering elements, which are aligned in a first array direction. The first deflector array 430 is oriented such that each of the N deflectors therein receives light from a different input port (e.g., such that a first beam of light launched from a first input port in the input port array 410 is incident on a first deflector in the first deflector array 430, and such that a second beam of light launched from a second input port in the input port array 410 is incident on a second deflector in the first deflector array). The second deflector array 450 is an array of N individually controllable beam steering elements, which are aligned in a second array direction. The second deflector array 450 is oriented such that each of the N deflectors therein is optically coupled to a different output port. Referring again to FIG. 4 and FIG. 5a, the first array direction is perpendicular to the second array direction.

Each deflector in the first 430 and second 450 arrays selectively deflects (about one dimension) light incident thereon at a controllable angle. More specifically, each deflector in the first 430 and second 450 arrays selectively deflects light incident thereon in a switching direction. For deflector arrays having deflectors that only provide deflection in one dimension (i.e., 1D deflectors) the term "switching direction" refers to the general direction that light is directed. For example, if a 1D deflector is configured to deflect light at upward and/or downward angles, as for example the first array 430 illustrated in FIGS. 5a and 5c, the switching direction is a vertical direction (i.e., parallel to the y-axis). If the deflector is configured to deflect light at an angle to the side, as for example the second array 450 illustrated in FIGS. 5a and 5b, the switching direction is a horizontal direction. Referring again to FIGS. 4 and 5a, the array direction for the first deflector array 430 is parallel to the x-axis, whereas the switching direction for the same deflector array is parallel to the y-axis. The switching direction for the first deflector array 430 and the switching direction in second deflector array 450 are perpendicular to each other.

In one embodiment, each of the first deflector array 430 and second deflector array 450 is array of transmissive elements, such as an array of liquid crystal phase elements or tiltable prisms. For example, in one embodiment each of the first deflector array 430 and second deflector array 450 is a liquid crystal phase modulator array, which provides selective beam steering via refractive index control. In this embodiment, the input port array 410 and/or output port array 470 typically are optically coupled to one or more elements producing light having a predetermined polarization state.

In another embodiment, each of the first deflector array 430 and the second deflector array 450 is an array of reflective elements, such as a tilting mirror array or a reflective array of liquid crystal phase elements. In embodiments including a tilting mirror array, tilting of each mirror in the mirror array is achieved using one of the many actuators known in the art (e.g., electrostatic, piezoelectric, electromechanical, or electromagnetic actuators). For example, in one embodiment, each of the first deflector array 430 and the second deflector array 450 is a micro-electromechanical system (MEMS) array of electrostatically controlled micro-mirrors (e.g., a MEMS array on a MEMS chip). When each deflector in the first deflector array 430 and the second deflector array 450 is a micro-mirror, the micro-mirrors within each array is tiltable about a common switching axis, which is perpendicular to the switching direction and parallel to the array direction. Referring again to FIGS. 4 and 5a, if the first deflector array 430 and second deflector array 450 are MEMS arrays, the switching axis for the first deflector array 430 will be substantially perpendicular to the switching axis of the second deflector array 450. In embodiments wherein each of the first deflector array 430 and the second deflector array 450 is a liquid crystal on silicon phase modulator array, the light beams are steered by linearly tilting the incoming beam's phase front.

The angle-to-offset (ATO) element 440 directs the light transmitted between the first 430 and second 440 deflector arrays. More specifically, the ATO element 440 transforms beam angles produced by the first 430 and second 450 deflector arrays and transmitted toward the ATO element 440 into beam offsets (i.e., relative to the optical axis of the ATO element). Such an ATO element is sometimes referred to as a "Fourier lens." In general, the ATO element 440 will be an element having optical power, such as a convex lens (e.g., a bi-convex, plano-convex, or concave-convex (meniscus) lens), a GRIN lens, a concave mirror, etc. For example, in one embodiment the ATO element is a spherical lens having a focal length f. In another embodiment, the ATO element is formed from two or more spherical lenses.

Figure 5A:
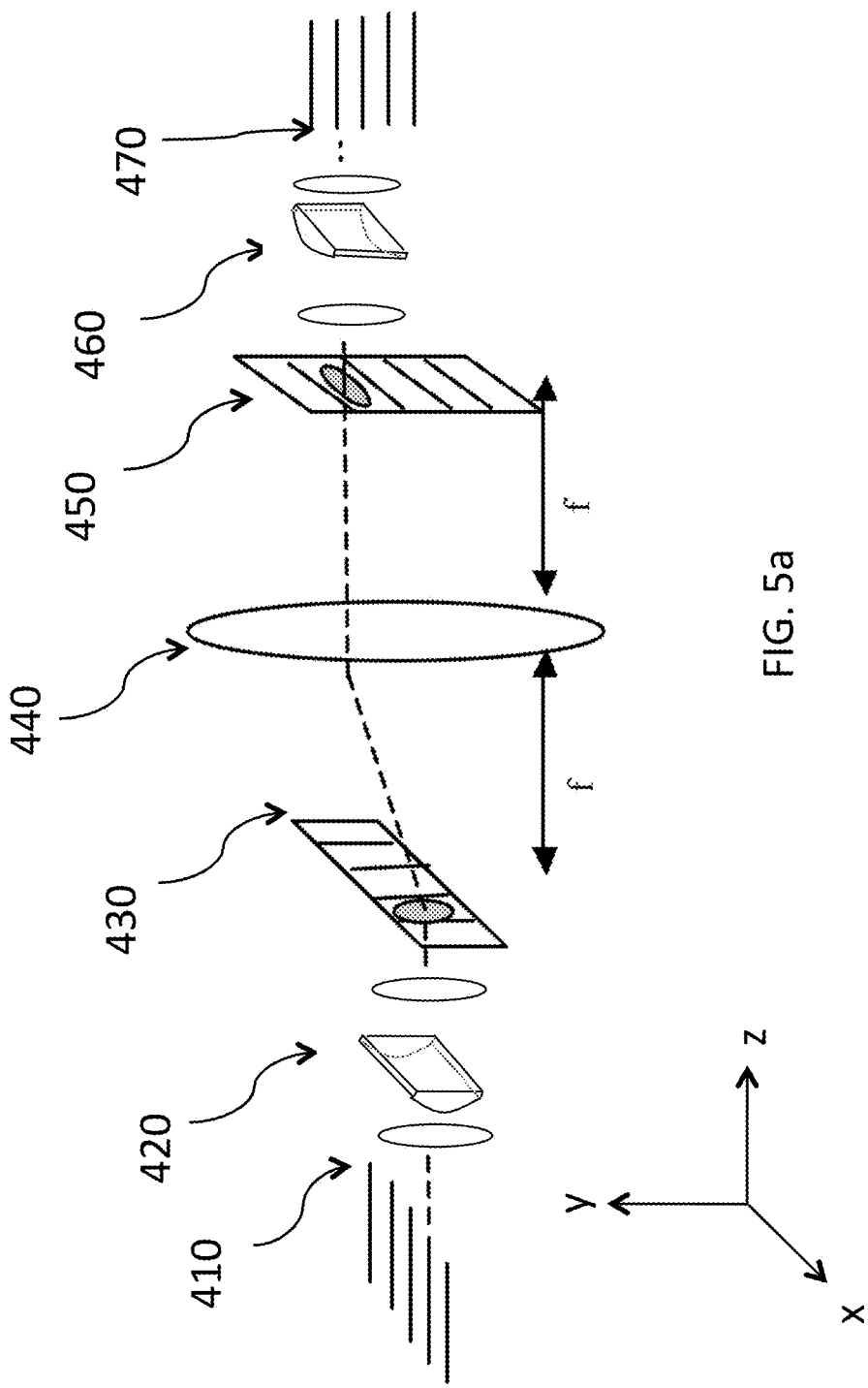
FIG. 5a is a schematic diagram of a switch core in accordance with one embodiment of the instant invention wherein the beam shaping optics include two spherical lenses and a cylindrical lens.

The ATO element 440 is optically disposed between the first 430 and second 450 deflector arrays, typically such that each of the first 430 and second 450 deflector arrays is disposed substantially at a focal plane of the ATO element 440. Notably, the ATO element 440 illustrated in FIGS. 4 and 5a is shown as a lens for ease of illustration only. In embodiments in which the ATO element 440 is reflective, the optical paths illustrated in the appended figures are "folded" about the plane of the ATO element 440. If the ATO element 440 is a lens, the first 430 and second 450 deflector arrays will be disposed on opposite sides of the ATO lens substantially at opposing focal planes. If the ATO element 440 is a mirror, the first 430 and second 450 deflector arrays will be disposed on a same side of the ATO mirror, substantially at the same focal plane.

The use of ATO elements in optical switch cores is known in the art, and is for example, described in further detail in Canadian Patent Application No. 2,326,362, the disclosure of which is herein incorporated by reference. However, in each case, the beams of light incident on the ATO lens and deflector arrays are assumed to have a circular cross-section. When the incident beam of light has a round cross-section, the ATO element is considered to function as a "true" ATO element when the focal length f approximately corresponds to the near zone length (multi mode) or Rayleigh range (single mode) of the beam of light incident on the ATO element. The use of a symmetric arrangement and a true ATO element means that the size (i.e., the diameter) of a light beam routed through the switch core is substantially the same at both input and output port arrays, thus facilitating optimal coupling of the beam between input and output optical fibers/waveguides.

Referring again to FIGS. 4 and 5a, the beams of light incident on the deflector arrays 430/450 and ATO element 440 have an elliptical cross-section. In this case, the ATO element 440 is considered to function as a "true" ATO element when the focal length f of the ATO element 440 is approximately equal to the square root of the ((Rayleigh range of beam major axis)*(Rayleigh range of beam minor axis)), such that the major axis of a light beam incident on the first deflector array 420 transforms to be equal to the minor axis of the light beam on the second deflector array 450, and such that the minor axis of a light beam on the first deflector array 420 transforms to be equal to the major axis of the light beam on the second deflector array.

In one embodiment, the ATO element 440 in FIGS. 4 and 5a does not function as a true ATO element. In another embodiment, the ATO element 440 in FIGS. 4 and 5a does function as a true ATO element. For example, referring again to FIG. 5a, in one embodiment the input beam shaping optics 420, output beam shaping optics 470, first deflector array 430, and second deflector array 450 are symmetrically disposed about the ATO element 450, which has a focal length f substantially equal to the square root of the ((Rayleigh range of beam major axis)*(Rayleigh range of beam minor axis)) of the light beams at the deflector arrays 430/450. Advantageously, this symmetric configuration provides a relatively compact and simple design.

Figure 5B:
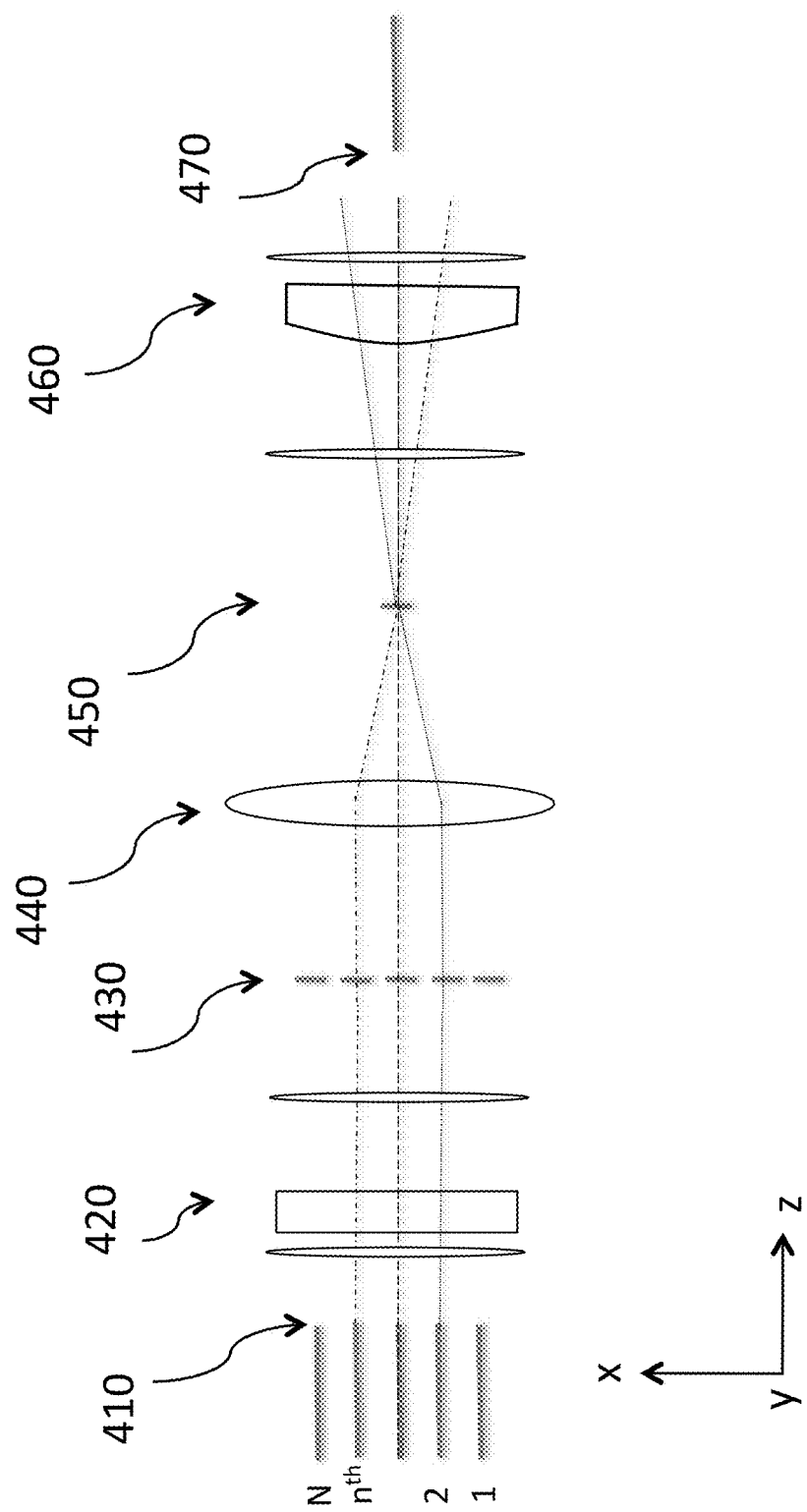
Figure 5C:
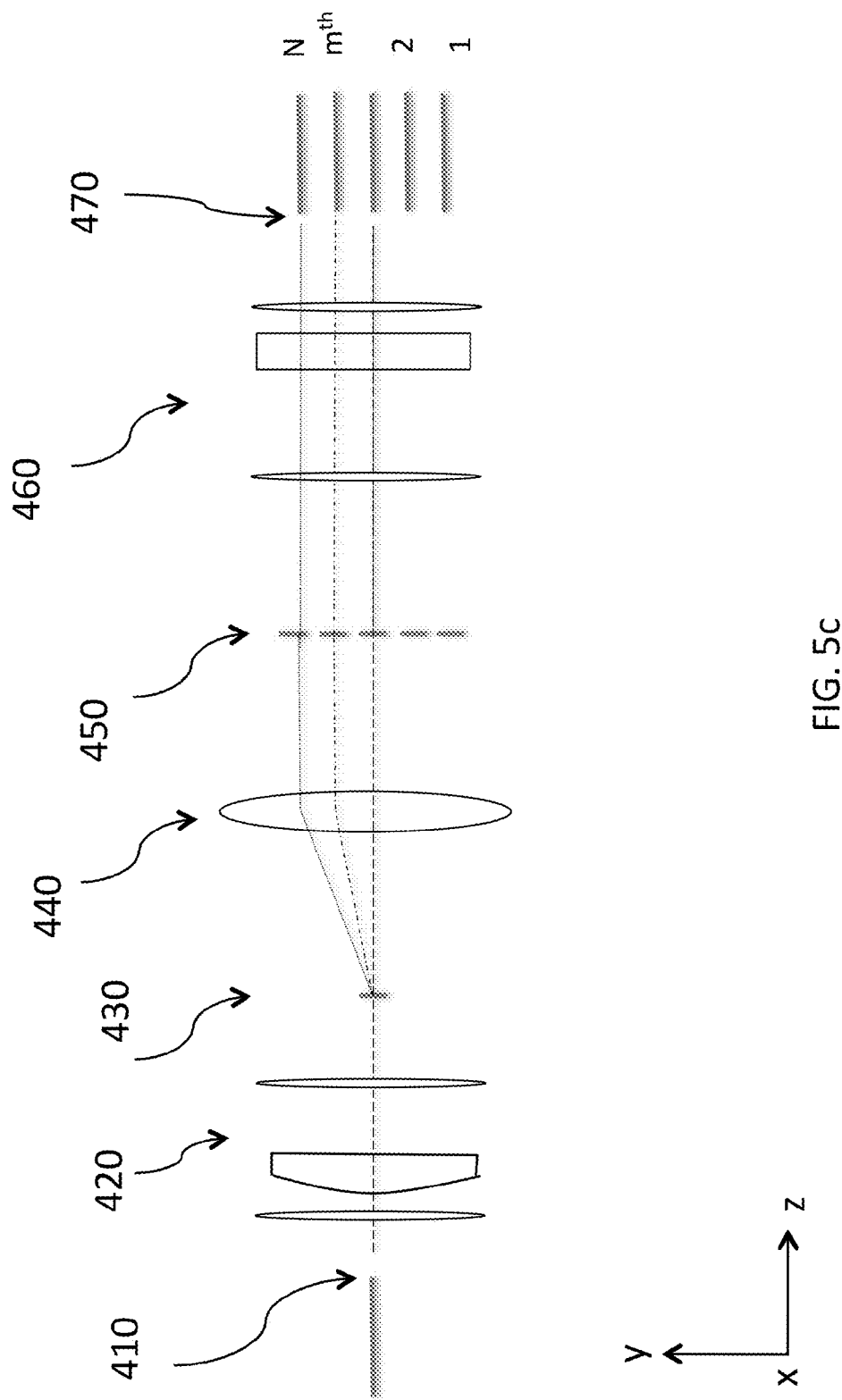

Referring also to FIGS. 5b and 5c, the operation of the optical cross-connect in FIG. 5a is described in further detail. Referring to FIG. 5b, a beam of light is launched into the optical switch core at the nth input port in the array of input ports 410. In general, the beam of light will be a substantially collimated beam of light (e.g., collimated via a micro-lens from a micro-lens array (not shown)). The beam of light passes through the input beam shaping optics 420, which transform the beam of light so that it has an elliptical cross-section. The beam of light then propagates to the nth deflector in the first deflector array 430, wherein it is incident thereon with an elliptical beam spot having a major axis parallel to the switching direction of the deflector array 430 (e.g., elongated in the vertical direction such that the major axis is parallel to the y-axis). The ATO element 440 directs the beam of light transmitted from/through the nth deflector in the first deflector array 430 towards the second deflector array 450.

Referring also to FIG. 5c, the nth deflector in the first array 430 selectively deflects the beam of light at a first angle in the switching direction. As a result, the beam of light is incident on the ATO element 440 at an angle relative to the optical axis of the ATO element 440 (i.e., represented by a dash-dot-dash line). The ATO element 440 transforms this angle to an offset (e.g., illustrated as a vertical offset) relative to the optical axis of the ATO element 440. More specifically, the beam of light is directed to the mth deflector of the second deflector array 450, which is determined by the first angle (i.e., the deflection angle provided by the nth deflector in the first array 430 will determine which deflector in the second array 450 the beam of light will be directed to). The beam of light is incident on the mth deflector in the second deflector array 450 with an elliptical beam spot having a major axis parallel to the switching direction of the second deflector array 450 (e.g., elongated in the horizontal direction such that the major axis is parallel to the x-axis). For efficient coupling of light to the mth output port, the mth deflector should be set to direct the beam toward the mth output port. Conversely, if we imagine light propagating from the mth output port to the mth deflector of the second deflector array, the mth deflector should be set to deflect the beam toward the nth deflector of the first deflector array. The mth deflector, selectively deflects the beam of light to the mth output port. More specifically, the mth deflector either deflects the beam of light at an angle away from the mth output port, or towards the mth output port. The beam of light is directed to the output beam shaping optics 460, which transform the beam such that it has a circular cross-section before it is focused on the mth output port. In general, the angle provided by the mth deflector will be selected to either block the light beam entirely from reaching the mth output port or to optimize optical coupling with the mth output port, however, in some embodiments, the angle is selected to provide a predetermined amount of attenuation.

Advantageously, providing two deflector arrays having substantially perpendicular switching directions, wherein the two deflector arrays are optically disposed on either side of an ATO element means that only a single row of deflectors is required for each of the deflector arrays (i.e., 1D arrays), and that each deflector only needs to provide deflection in one dimension (i.e., 1D deflectors). For example, if the deflector arrays are MEMS mirrors then each MEMS mirror only needs to tilt about one axis, not two (i.e., a 1D MEMs mirror). Accordingly, the deflector arrays are relatively simple with lower manufacturing costs. For example, if the deflector arrays are MEMS micro-mirror arrays then each deflector will only require two drive electrodes (i.e., a 1D MEMS mirror requires only two drive electrodes, instead of the four required for a 2D tilting MEMS mirror), thus reducing the cost of drive electronics. In addition, it is easier to manufacture 1D tilting MEMS mirrors than 2D tilting MEMS mirrors, so manufacturing cost is lower and yield is higher. Furthermore, since each deflector array only has a single row of deflectors, the input and output fiber arrays are 1D arrays instead of 2D arrays, which are simpler and cheaper to manufacture.

Further advantageously, providing input and output beam shaping optics that provide an elliptical beam spot on the two deflector arrays, wherein the beam spots are elongated in the switching direction, means that the individual deflectors in the deflector arrays can be smaller in area since the beam size is reduced in the array direction. This is particularly advantageous when the deflector arrays 430,450 are MEMS mirrors. For example, since the cost of MEMS devices is roughly proportional to the surface area of the MEMS mirror, this results in a cost savings.

Further advantageously, in addition to reducing the size of the individual MEMS chip, and thus chip cost, by using elliptical beams, combining the use of elliptical beams with the crossed deflector arrays reduces the overall switch size. For example, consider the switch core illustrated in FIGS. 4 and 5*a* if the input beams and output beams were round and of equal size (e.g., having radius $\omega_0$). In this case, the focal length f of the ATO lens 440 should be equal to the Rayleigh range $z_r$ of the input and output beams:

$$f=z_r=\pi\omega_0^2/\lambda \quad (1)$$

where $\omega_0$ is the beam waist size. If the input beam size and output beam size are not the same, the focal length f of the lens should be $$f=\pi(\omega_{02})/\lambda. \quad (2)$$

Therefore by reducing $\omega_{02}$ the focal length f of the lens is reduced and the overall switch size is reduced. Note that in both x and y directions, the relationship in Eq. (2) holds, since in one case $\omega_{01}$ is the input beam size and $\omega_{02}$ is the output beam size, and in the other case $\omega_{01}$ is the output beam size and $\omega_{02}$ is the input beam size.

The beam size in the switching direction of the first array 430 should be a certain minimum size in order to obtain a sufficiently small divergence angle of the beam and thus enable switching to the desired number of distinct output ports. The divergence angle $\theta$ of the beam is related to the beam size by $$\theta=\lambda/(\pi\omega_0). \quad (3)$$

As an illustrative example, if $\theta_{lens}$ is the divergence angle that would allow the beam to be fully captured by the ATO lens 440, the beam size must be greater than $$\omega_{min}=\lambda/\pi\theta_{lens} \quad (4)$$

to ensure that the beam will pass through the ATO lens 440. To enable switching to 30 ports would require the beam divergence to be less than $\theta_{lens}/30$ (e.g., since we should be able to direct the beam to 30 distinct positions within the aperture of the lens 440) and thus the beam size must be greater than $30*\omega_{min}$.

However, in the non-switching direction (i.e., in the array direction), there is no such restriction, except that the beam divergence should fall within the aperture of the lens 440. Accordingly, the beam width in the array direction can be greatly reduced, thus reducing the overall beam spot size at the output ports, and as a result the required focal length f. Reducing the required focal length reduces the overall size of the switch core. Notably, when the deflector arrays are MEMS micro-mirror arrays, it is usually not the lens aperture which limits the switch design, but factors such as the maximum beam steering angle achievable by the MEMS micro-mirrors. Regardless, providing beam shaping optics that cause the beam spots to be reduced in the array direction provides for a more compact optical switch.

In the embodiments illustrated in FIGS. 4 and 5*a*, the optical layout has been illustrated in an unfolded configuration for clarity. In some embodiments, the optical layout will provide a folded configuration.

Figure 6:
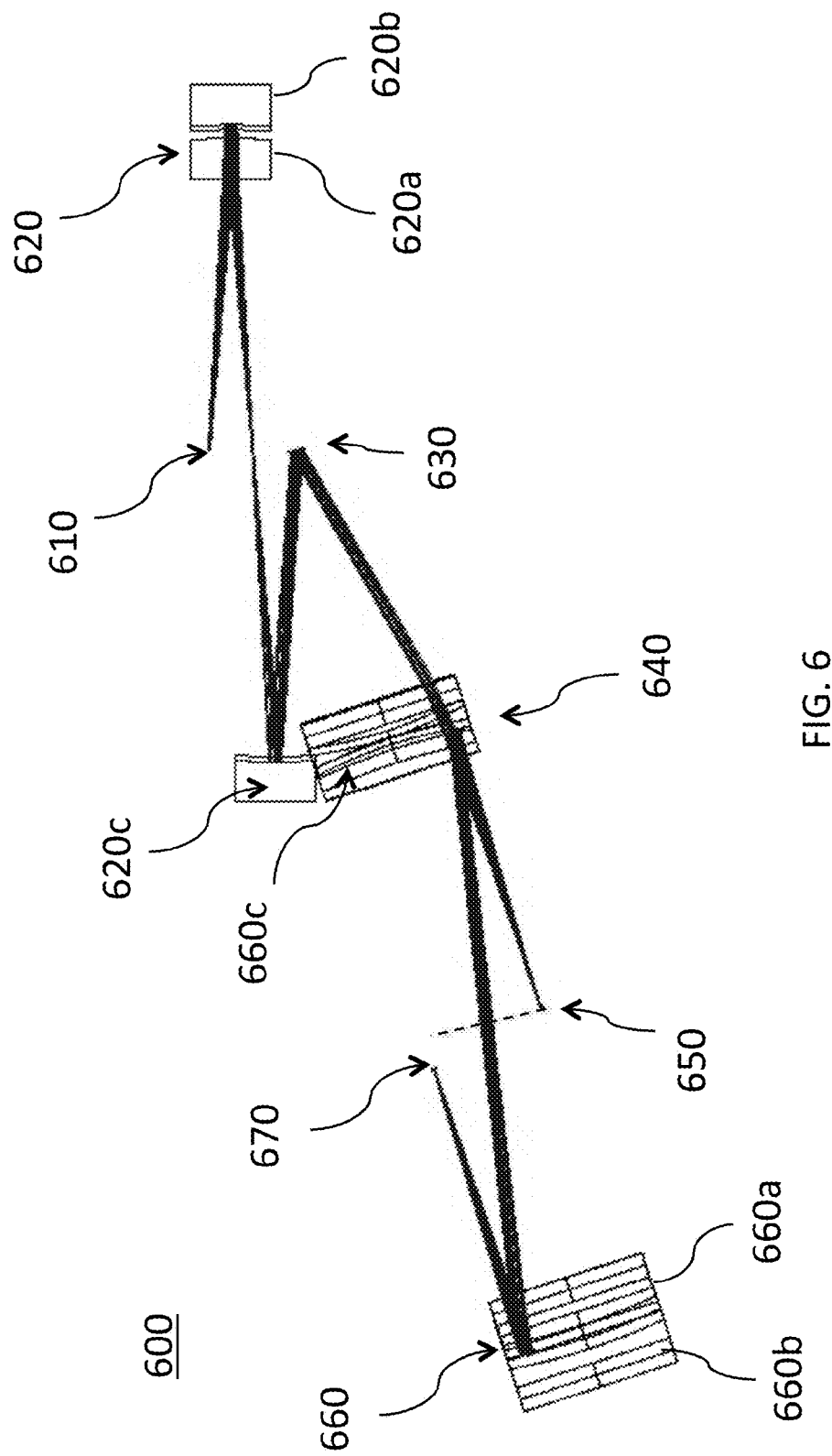
FIG. 6 is a side view of one configuration of a switch core in accordance with an embodiment of the instant invention.

Referring to FIG. 6, there is shown a side view of an optical cross-connect in accordance with one embodiment of the instant invention. The optical cross-connect has a switch core 600 that includes an input port array 610, input beam shaping optics 620 (i.e., including a cylindrical lens 620*a*, a first spherical mirror 620*b*, and a second spherical mirror 620*c*), a first deflector array 630 (only one deflector is visible since the array direction is out of the page), an angle-to-offset (ATO) element 640 formed from first and second lens elements (e.g., two spherical lenses), a second deflector array 650 (array direction in the plane of the page), output beam shaping optics 660 (i.e., including a cylindrical lens 660*a*, a first spherical mirror 660*b*, and a second spherical mirror 660*c*), and an output port array 670.

Each input port in the input port array 610 is optically coupled to an input optical fiber or input waveguide, whereas each output port in the output port array 670 is optically coupled to an output optical fiber or output waveguide. More specifically, the input port array 610 is optically coupled to an input fiber array terminated in a first microlens array and the output port array 670 is optically coupled to an output fiber array terminated in a second microlens array. Each input port array 610 and each output port array 670 will have N ports aligned in an array direction, wherein the array directions of the first and second port arrays are perpendicular. Notably, only one input port and one output port is shown in FIG. 6 for clarity.

Each of the input beam shaping optics 620 and output beam shaping optics 660 includes two spherical mirrors and a cylindrical lens. The input beam shaping optics 620 cause beams of light propagating from the array of input ports 610 to produce elliptical beam spots on the first deflector array 630, whereas output beam shaping optics 660 shape the elliptical beams of light propagating from the second deflector array 650 toward the array of output ports 670 into beams of light having a circular cross-section (i.e., there are round beam spots at the array of output ports 670). The cylindrical lens in the input beam shaping optics 620*a* is oriented with its cylindrical axis perpendicular to the cylindrical axis of the cylindrical lens in the output beam shaping optics 660*a*.

Each of the first deflector array 630 and second deflector array 650 is a micro-electromechanical system (MEMS) array of electrostatically controlled micro-mirrors (e.g., a 1D array of 1D MEMS micro-mirrors on a MEMS chip). More specifically, each MEMS array 630/650 includes a 1D array of N 1D MEMS micro-mirrors aligned in an array direction. The array direction for the first array 630 is perpendicular to the array direction of the second array 650. The micromirrors within each array are tiltable about a common switching axis, which is parallel to the corresponding array direction. For example, in one embodiment, the micromirror arrays are fabricated using the design disclosed, in U.S. Pat. No. 8,531,752, which is hereby incorporated by reference.

The angle-to-offset (ATO) element 640 directs the light transmitted between the first 630 and second 640 deflector arrays. More specifically, the ATO element 640 transforms beam angles produced by the first 630 and second 650 deflector arrays and transmitted toward the ATO element 640 into beam offsets (i.e., relative to the optical axis of the ATO element). In this embodiment, the ATO element 640 is formed from two lens elements, each having a focal length f. The ATO element 640 is optically disposed between the first 630 and second 650 deflector arrays, typically such that the first 630 and second 650 deflector arrays are disposed at opposing focal planes of the ATO element 640.

Figure 7:
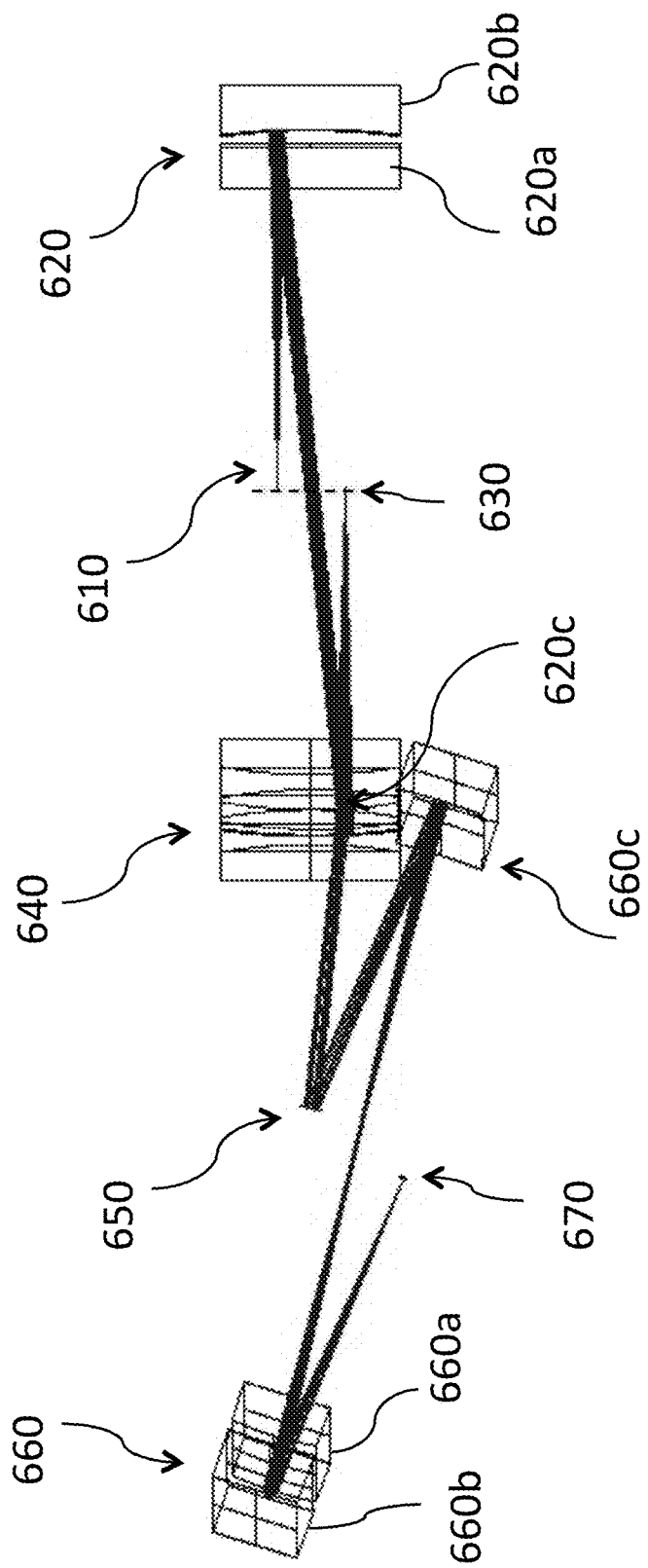
FIG. 7 is a top view of the switch core in FIG. 6.

In operation, the spherical mirrors 620b, 620c, 660b, 660c, provide a relay system that directs light within the switch core. In particular, a light beam input at an input port is directed by the first spherical mirror 620b to second spherical mirror 620c, and by the second spherical mirror 620c to the first deflector array 630. The first deflector array 630 directs the beam of light to the ATO element 640, and the ATO element 640 directs the beam of light to the second deflector array 650. The second deflector array 650 directs the beam of light to the second spherical mirror 660c (e.g., which is disposed in front of the ATO element 640 in FIG. 6), and the second spherical mirror 660c directs the beam of light to the output port via the first spherical mirror 660b. Referring also to FIG. 7, which is a top view of the optical cross-connect in FIG. 6, it is apparent that the spherical mirror 660c is physically offset from the ATO element 640, whereas in FIG. 6 it is apparent that the spherical mirror 620c is physically offset from the ATO element 640.

Figure 8:
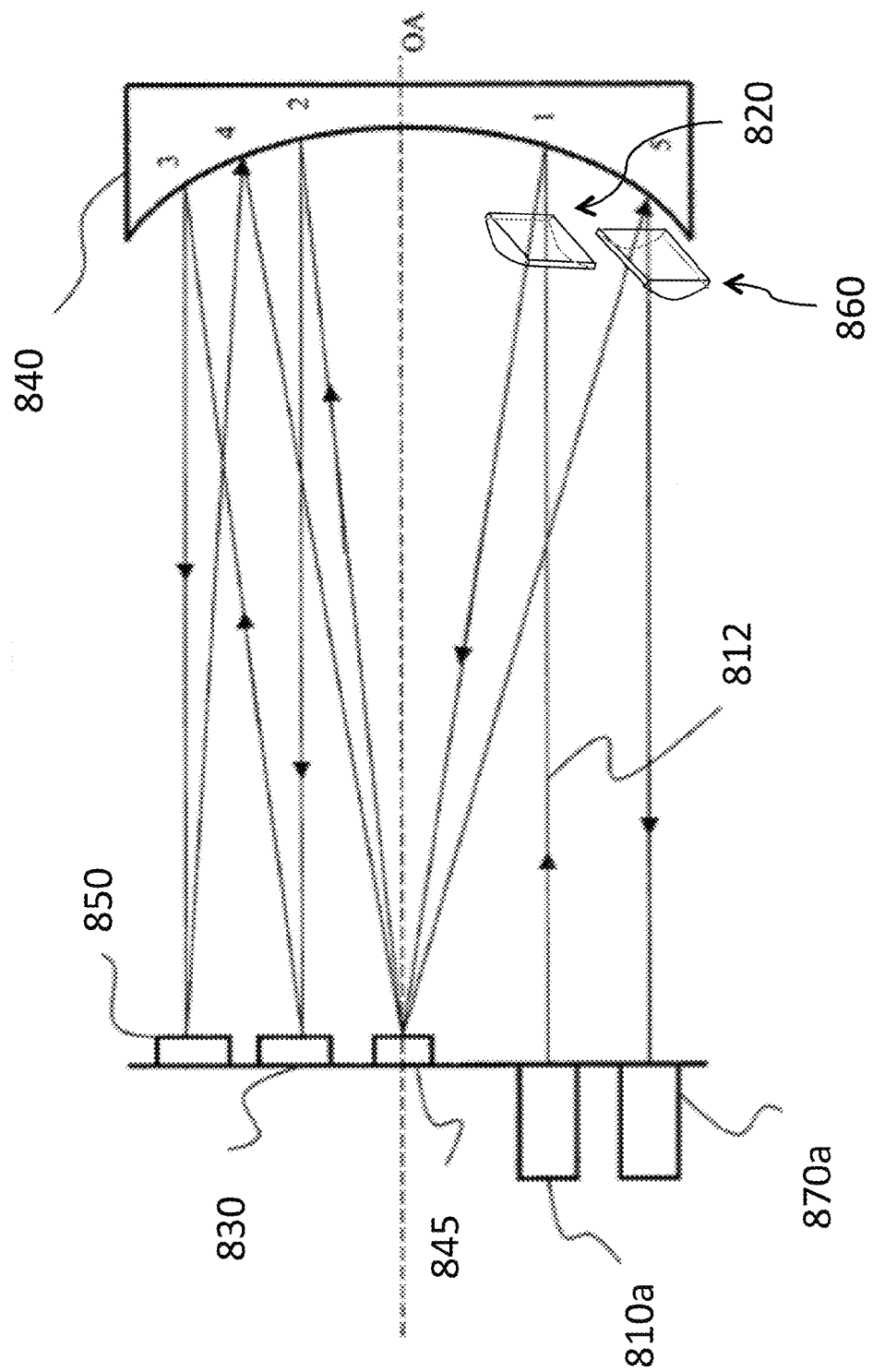
FIG. 8 is a schematic diagram of a switch core in accordance with an embodiment of the instant invention including a concave mirror.

Referring to FIG. 8, there is shown a schematic diagram of an optical cross-connect in accordance with another embodiment of the instant invention. The optical cross-connect includes an input port array including a first input port 810a, input beam shaping optics 820, a first deflector array 830, a concave mirror 840, a fixed mirror 845, a second deflector array 850, output beam shaping optics 860, and an output port array including an output port 870a. The array directions of the first 830 and second 850 deflector arrays are perpendicular. In addition, the switching directions of the first 830 and second 850 deflector arrays are perpendicular. The input/output port arrays and first/second deflector arrays are disposed on the same side of the switch core, typically in either in a side-by-side configuration or in a cross-shaped configuration.

Each input port in the input port array is optically coupled to an input optical fiber or input waveguide, whereas each output port in the output port array is optically coupled to an output optical fiber or output waveguide. More specifically, each of the input port array and output port array is coupled to a planar waveguide concentrator in which the waveguide spacing equals the fiber spacing on a first end coupled to the fiber array, and the waveguide spacing is smaller than the fiber spacing on a second opposite end. Each input port array and each output port array will have N ports aligned in an array direction, wherein the array directions of the first and second port arrays are perpendicular.

The input beam shaping optics 820 and output beam shaping optics 860 includes first and second cylindrical lenses, respectively, wherein the cylindrical axis of the first lens is substantially perpendicular to cylindrical axis of the second lens. Notably, different sections of the concave mirror 840 also help to shape input/output beams of light. In particular, the first cylindrical lens and the parts of the concave mirror 840 that provide reflections 1 and 2 correspond to the input beam shaping optics 820, whereas the second cylindrical lens and the parts of the concave mirror 840 that provide reflections 4 and 5 correspond to the output beam shaping optics 860, The input beam shaping optics 820 cause beams of light propagating from the array of input ports to produce elliptical beam spots on the first deflector array 830, whereas output beam shaping optics 860 shape the elliptical beams of light propagating from the second deflector array 850 toward the array of output ports 870 into beams of light having a circular cross-section (i.e., there are round beam spots at the array of output ports). The cylindrical lens in the input beam shaping optics is oriented with its cylindrical axis perpendicular to the cylindrical axis of the cylindrical lens in the output beam shaping optics.

Each deflector in the first 830 and second 850 arrays selectively deflects (about one dimension) light incident thereon at a controllable angle. More specifically, each deflector in the first 830 and second 850 arrays selectively deflects light incident thereon in a switching direction, which is perpendicular to the corresponding array direction. The switching direction for the first deflector array 830 and the switching direction in second deflector array 850 are perpendicular to each other. In one embodiment, each of first deflector array 830 and the second deflector array 850 is a liquid crystal on silicon phase modulator array. More specifically, each of the first deflector array 830 and the second deflector array 850 is a 1D array of N 1D liquid crystal deflectors aligned in an array direction. In another embodiment, each of the first deflector array 830 and second deflector array 850 is a micro-electromechanical system (MEMS) array of electrostatically controlled micro-mirrors (e.g., a 1D array of 1D MEMS micro-mirrors on a MEMS chip). Optionally, each of the first 830 and second 850 deflector arrays include one or more optical by-passes (e.g., a hole or opening in the MEMS chip array that allows light to pass therethrough substantially unaltered).

The concave mirror 840 directs the light transmitted between the first 830 and second 840 deflector arrays. More specifically, at reflection 3 the concave mirror 840 transforms beam angles (not shown) produced by the first 830 and second 850 deflector arrays and transmitted toward the concave mirror 840 into beam offsets (i.e., relative to the optical axis of the concave mirror). The concave mirror 840 has a focal plane at which the array of input ports 810, first deflector array 830, fixed mirror 845, second deflector array 850, and output port array are disposed.

In operation, a beam of light 812 is launched into the switch core through the input port 810a towards the concave mirror 840. The concave mirror 840 directs the beam of light 812 (i.e., having the elliptical cross-section provided by the beam shaping optics 820) to the fixed mirror 845, which redirects the beam 812 back to the concave mirror 840 once again. The concave mirror 840 redirects the beam 812 to one of the deflectors in the first deflector array 830, which selectively deflects the beam of light an angle in the switching direction thereof and directs the beam 812 back to the concave mirror 840 for a third time. One of the deflectors in the second deflector array 850 then receives the beam of light 812 and selectively deflects the beam of light an angle in the switching direction thereof and redirects it back to the fixed mirror 845, once again, via the concave mirror 840. The beam of light 812 is then reflected off the concave mirror 840 for the fifth and last time and is directed to one of the output ports 870a via the output beam shaping optics 860. Advantageously, providing an ATO element formed from a concave mirror provides a relatively simple and compact configuration.

Numerous other embodiments can be envisaged without departing from the spirit and scope of the invention. Of course, the above embodiments have been provided as examples only. It will be appreciated by those of ordinary skill in the art that various modifications, alternate configurations, and/or equivalents will be employed without departing from the spirit and scope of the invention. Accordingly, the scope of the invention is therefore intended to be limited solely by the scope of the appended claims.

What is claimed is:

1. An optical cross-connect comprising:
   an input port array and an output port array, the input port array including a first input port for launching a beam of light;
   a first deflector array optically disposed between the input port array and the output port array, the first deflector array including a first plurality of individually controllable deflectors aligned in a first array direction, each deflector in the first plurality of individually controllable deflectors having a switching direction substantially perpendicular to the first array direction;
   a second deflector array optically disposed between the first deflector array and the output port array, the second deflector array including a second plurality of individually controllable deflectors aligned in a second array direction, the second array direction substantially perpendicular to the first array direction, each deflector in the second plurality of individually controllable deflectors having a switching direction substantially perpendicular to the second array direction;
   first beam shaping optics optically disposed between the input port array and the first deflector array and second beam shaping optics optically disposed between the output port array and the second deflector array, the first beam shaping optics for shaping the beam of light and providing a first elliptical beam spot at the first deflector array, a major axis of the first elliptical beam spot substantially parallel to the switching direction of the first deflector array; and
   an angle-to-offset element optically disposed between the first and second deflector arrays, the angle-to-offset element having an optical axis and at least one focal length,
   wherein each of the first and second deflector arrays is disposed substantially at a focal plane of the angle-to-offset element such that the angle-to-offset element directs the beam of light from the first deflector array to the second deflector array and provides a second elliptical beam spot on the second deflector array, the second elliptical beam spot having a major axis substantially perpendicular to the major axis of the first elliptical beam spot.

2. The optical cross-connect according to claim 1, wherein the angle-to-offset element comprises one of a convex lens, a GRIN lens, and a concave mirror.

3. The optical cross-connect according to claim 1, wherein the angle-to-offset element comprises at least one spherical lens or aspherical lens.

4. The optical cross-connect according to claim 1, wherein the angle-to-offset element has a focal length substantially equal to a square root of a Rayleigh range of the major axis of the first elliptical beam spot multiplied by a Rayleigh range of a minor axis of the first elliptical beam spot.

5. The optical cross-connect according to claim 1, wherein each of the first and second beam shaping optics comprises a cylindrical lens and two spherical lenses.

6. The optical cross-connect according to claim 1, wherein each of the first and second beam shaping optics comprises a cylindrical lens and two spherical mirrors.

7. The optical cross-connect according to claim 1, wherein each of the first and second beam shaping optics comprises first and second anamorphic prisms.

8. The optical cross-connect according to claim 1, wherein each of the first and second deflector arrays comprises one of a 1D array of 1D tilting MEMS micro-mirrors and a 1D array of 1D switching liquid crystal phased elements.

9. The optical cross-connect according to claim 1, wherein each deflector in the first plurality of individually controllable deflectors is a 1D tilting MEMS micro-mirror having a shape that is elongated in a direction substantially perpendicular to the first array direction, and each deflector in the second plurality of individually controllable deflectors is a 1D tilting MEMS micro-mirror having a shape that is elongated in a direction substantially perpendicular to the second array direction.

10. The optical cross-connect according to claim 1, wherein the input port array is parallel to the first deflector array and perpendicular to the output port array.

11. The optical cross-connect according to claim 1, wherein the input port array is optically coupled to an input optical fiber array, and the output port array is optically coupled to an output optical fiber array.

12. An optical cross-connect comprising:
    an array of input ports, each input port for providing a beam of light;
    input beam shaping optics for forcing each beam of light to have an elliptical cross-section;
    a first deflector array including a first plurality of deflectors, each deflector in the first plurality of deflectors comprising an individually controllable deflector optically coupled to a different input port, each deflector in the first plurality of deflectors disposed along a first axis and having a switching direction substantially perpendicular to the first axis, the first axis oriented relative to the first beam shaping optics such that the elliptical cross-section of each beam of light at the first deflector array has a major axis substantially perpendicular to the first axis;
    an angle-to-offset element for transforming deflection angles provided by the deflectors of the first deflector array into offsets in direction substantially perpendicular to the first axis, the angle-to-offset element having an optical axis and at least one focal length;
    a second deflector array including a second plurality of deflectors, each deflector in the second plurality of deflectors comprising an individually controllable deflector, each deflector in the second plurality of deflectors disposed along a second axis and having a switching direction substantially perpendicular to the second axis, the second axis substantially perpendicular to the first axis such the elliptical cross-section of each beam of light at the second deflector array has a major axis perpendicular to the second axis;
    second beam shaping optics for forcing the beams of light having an elliptical cross-section and deflected from the second deflector array to have a substantially circular cross-section; and
    an array of output ports, each output port for selectively receiving one of the beams of light having a circular cross-section.

13. The optical cross-connect according to claim 12, wherein the angle-to-offset element comprises at least one spherical lens.

14. The optical cross-connect according to claim 12, wherein the angle-to-offset element comprises one of a convex lens, a GRIN lens, and a concave mirror.

15. The optical cross-connect according to claim 12, wherein the angle-to-offset element has a focal length substantially equal to a square root of a Rayleigh range of the major axis of a first elliptical beam spot multiplied by a Rayleigh range of a minor axis of the first elliptical beam spot.

16. The optical cross-connect according to claim 12, wherein each of the first and second beam shaping optics comprises a cylindrical lens and two spherical lenses.

17. The optical cross-connect according to claim 12, wherein each of the first and second beam shaping optics comprises a cylindrical lens and two spherical mirrors.

18. The optical cross-connect according to claim 12, wherein each of the first and second beam shaping optics comprises first and second anamorphic prisms.

19. The optical cross-connect according to claim 12, wherein each of the first and second deflector arrays comprises one of a 1D array of 1D tilting MEMS micro-mirrors and a 1D array of 1D switching liquid crystal phased elements.

20. The optical cross-connect according to claim 12, wherein each deflector in the first plurality of deflectors is a 1D tilting MEMS micro-mirror having a shape that is elongated in a direction substantially perpendicular to the first axis, and wherein each deflector in the second plurality of deflectors is a 1D tilting MEMS micro-mirror having a shape that is elongated in a direction substantially perpendicular to the second axis.

* * * * *